(12) United States Patent
Egawa et al.

(10) Patent No.: US 6,710,339 B2
(45) Date of Patent: Mar. 23, 2004

(54) SCANNING PROBE MICROSCOPE

(75) Inventors: Akira Egawa, Chiba (JP); Tatsuya Miyatani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 3 days.

(21) Appl. No.: 09/814,520

(22) Filed: Mar. 22, 2001

(65) Prior Publication Data
US 2001/0030286 A1 Oct. 18, 2001

(30) Foreign Application Priority Data

Mar. 28, 2000 (JP) .................................... 2000-089451
Jul. 26, 2000 (JP) .................................... 2000-225153
Mar. 14, 2001 (JP) .................................... 2001-072722

(51) Int. Cl.$^7$ ................................................ G21K 7/00
(52) U.S. Cl. ...................................................... 250/310
(58) Field of Search ................................. 250/310, 306

(56) References Cited

U.S. PATENT DOCUMENTS 5,543,614 A * 8/1996 Miyamoto et al. ............ 250/234
5,825,670 A * 10/1998 Chernoff et al. ........... 364/571.02

* cited by examiner

Primary Examiner—John R. Lee
Assistant Examiner—Phillip A Johnston
(74) Attorney, Agent, or Firm—Adams & Wilks

(57) ABSTRACT

A scanning probe microscope capable of producing high precision sample images repeatedly has a driving unit for driving a sample or probe relative to the other microscopically in X, Y and Z directions, displacement detectors for measuring displacement of the driving unit in each of the X, Y and Z directions, and an image correction unit for storing output values of the displacement detectors as a data array for each of the X, Y and Z directions, performing a correction process on the data arrays, and producing an image of the sample based on the corrected data. A controller controls a measuring unit and output values of the displacement detectors are supplied to an operation/display unit connected to the controller and then supplied to an image correction device for image correction.

18 Claims, 14 Drawing Sheets

SCANNING PROBE MICROSCOPE

BACKGROUND OF THE INVENTION

The present invention relates to Scanning Probe Microscopes (SPM) typified by Scanning Tunnel Microscopes (STM) and Atomic Force Microscopes (AFM).

Currently, Scanning Probe Microscopes (SPM) typified by Scanning Tunnel Microscopes (STM) and Atomic Force Microscopes (AFM) are widely used as means for monitoring the shape of the surface of microscopic materials. A SPM monitors shapes and properties of a material surface using mutual physical interaction between a probe and a sample surface and can monitor with a high degree of resolution down to orders of a few nanometers. In order to achieve high resolution, it is necessary to minutely drive the sample and the probe in the X, Y and Z directions, with this driving normally being carried out using a piezoelectric element. The most typical of such piezoelectric elements is the cylindrical piezoelectric element. A cylindrical piezoelectric element is provided with electrodes to which individual drive signals can be applied. This enables driving in each of the X, Y and Z directions using individual piezoelectric elements. This has the benefit of maintaining relatively substantial displacement in the X and Y directions. It is then possible to reproduce an image of observation for the shape etc. of the surface of the material by mapping drive signals for the X, Y and Z directions applied to these cylindrical piezoelectric elements in three dimensions. FIG. 13 shows a configuration for a related SPM utilizing a cylindrical piezoelectric element. A probe 52 is fitted to a cylindrical piezoelectric element 50 via a probe support table 51. Changes in the probe in response to physical mutual interaction with a sample 53 on a sample table 54 are detected by mutual interaction sensing means 55. The object that is actually detected by the mutual interaction sensing means 55 is deflection of the probe 52 in response to atomic force when the mutual interaction is atomic force, and is tunnel current flowing between the probe 52 and the sample 53 in the case of tunnel current. It is possible to monitor the shape etc. of the surface of the sample 53 by scanning the X and Y directions while controlling the amount of driving of the cylindrical piezoelectric element 50 in the Z direction in response to the output signal of the mutual interaction sensing means 55. This control is performed by a SPM controller 56 and outputting of the monitored image and overall operation is carried out by operation/display means 57.

This related SPM is effective as a means for monitoring the surface of microscopic regions due to its high resolution. However, in recent years, the desire to measure the shape of semiconductors and recording media using SPM to a greater degree of accuracy has increased. When a SPM is viewed as this kind of measuring device, precision of positioning and repeatability precision are insufficient. In the related art, scanning in the X and Y directions is open-loop controlled so that the position of the probe or sample is decided by displacement of a piezoelectric element in line with an applied drive signal. However, in reality, the extent of this displacement is not proportional to the drive signal due to the existence of hysterisis and non-linear actions, etc. This makes it difficult to determine the position of the probe. The actual shape of a monitored image obtained in this manner is therefore not reliably reproduced. In order to resolve this problem, the drive signal and displacement of the piezoelectric element are measured for related SPM and compensation is performed so that the piezoelectric element acts in a linear manner. However, with this method, the compensation depends on past results and although this alleviates the influence of large amounts of hysterisis, etc., it cannot be said to be sufficient to prevent errors in microscopic positioning. Further, hysterisis and non-linear operations are differences depending on variations in the material of the element, shape precision, and electrode precision, etc., and it is therefore necessary to obtain compensation coefficients for each element. Further, there are also problems where errors due to environmental conditions such as temperature and vibrations etc. change.

A case where the thickness of a cylindrical piezoelectric element is not even will now be considered as an example of a non-linear operation occurring due to the precision with which a shape is made. FIG. 14A is a cross-sectional view of a cylindrical piezoelectric element where the thickness of left and right elements is uniform, and FIG. 14B is a cross-sectional view of a cylindrical piezoelectric element where the thickness of left and right elements is not uniform. The piezoelectric element actually used is provided with a plurality of electrodes and extends and compresses in three dimensions but here, for simplicity, the piezoelectric elements in FIG. 14A and FIG. 14B are considered to have electrodes uniform in a plane going from inside to out and are considered to be extendable and compressible in a vertical direction only. In the case in FIG. 14A, when a potential is applied across inner and outer electrodes, the desired characteristic is that shown by the dashed line in FIG. 14A where there is displacement in only a vertical direction in order to extend the piezoelectric element in a uniform manner to both the left and the right. When the thickness of the element is not uniform as shown in FIG. 14B, even if the same potential as for FIG. 14A is applied, there is also displacement in a horizontal direction shown by the broken line due to the thin portion on the left side in FIG. 14B being more extended, i.e. even if the same potential is applied, there is not just the error occurring in the vertical direction, but also a substantial error in the horizontal direction. It is therefore clear that substantial errors occur when a shape image is obtained from just a drive signal using the kind of piezoelectric element shown in FIG. 14B as a probe microscope.

SUMMARY OF THE INVENTION

It is an object of the present invention to provide a scanning probe microscope capable of repeatedly reproducing images for the shape of a sample etc. with a high degree of accuracy without being influenced by the environment. A scanning probe microscope of the present invention therefore comprises displacement detection means capable of measuring displacement of the microscopic driving means in the X, Y and Z directions, and image correction means for recording values outputted by each displacement detection means as arrayed data during scanning of a sample with a probe, and making an image from the recorded arrayed data with the relative positions with respect to the X, Y and Z directions corrected.

With this configuration, the position of the probe or sample can be accurately detected without this depending on the material of the element, the precision with which the shape is made, or external environmental conditions. Actual shapes can therefore be reproduced in a highly precise manner. This configuration is extremely straight forward in that not only can it be achieved by merely adding displacement detection means and image correction means to the SPM configuration of the related art, but also none of the functionality of the related SPM is lost.

DESCRIPTION OF THE PREFERRED EMBODIMENT

Next, a description is given of an embodiment of the present invention.

Figure 1A:
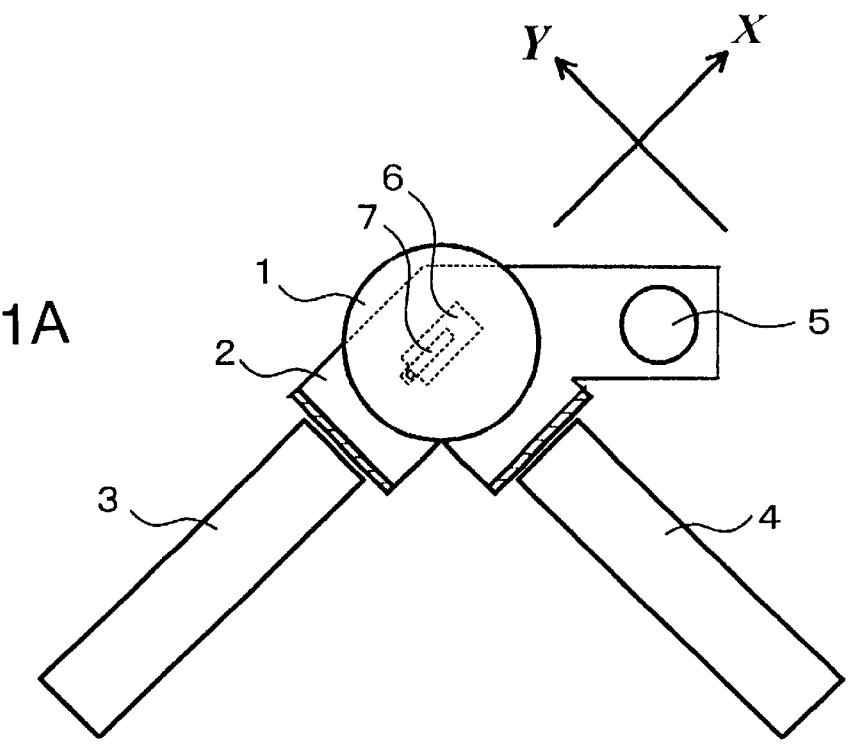
FIG. 1A is a view from above schematically showing a configuration for a SPM measuring unit of the present invention.
Figure 1B:
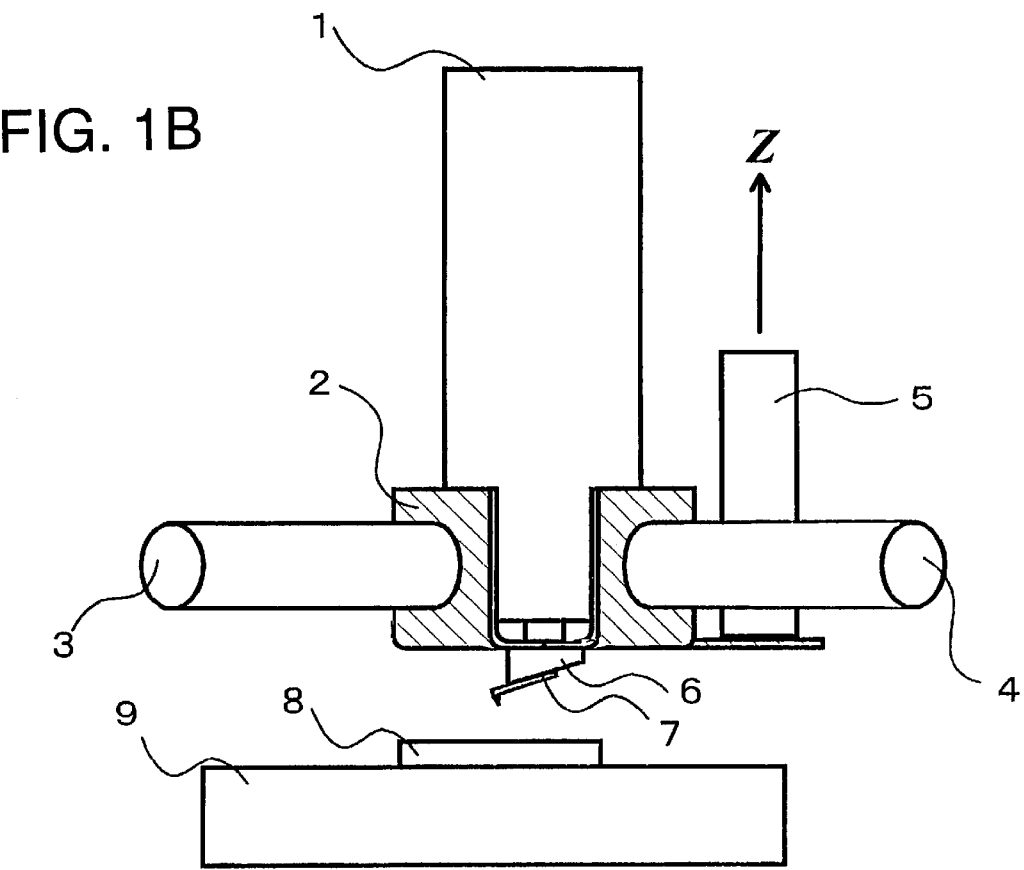
FIG. 1B is a front view schematically showing a configuration for a SPM measuring unit of the present invention.

FIG. 1 are schematic views showing a configuration for a SPM measuring unit of the present invention. FIG. 1A is an upper view and FIG. 1B is a front view. As with the related art SPM, a probe support table 6 and a probe 7 are fitted to a scanner 1 moveable in an XYZ direction, and a sample 8 is located on a sample table 9. The surface of the sample 8 can then be scanned while detecting mutual physical interaction between the probe 7 and the sample 8. Although not shown in FIG. 1, a mechanism for sensing mutual interaction is also incorporated, as with the SPM of the related art. An X displacement sensor 3, Y displacement sensor 4, and Z displacement sensor 5 are also incorporated into this embodiment so that movement of the probe 7 can be detected. It is therefore possible to read in the amount of displacement in the X, Y and Z directions while scanning using the scanner 1. In this embodiment, a sensor counter electrode 2 is fitted to the scanner 1 as it is assumed that the displacement sensors are electrostatic capacitance sensors, but interferometers or optical sensors etc. may also be utilized as sensors.

Figure 2:
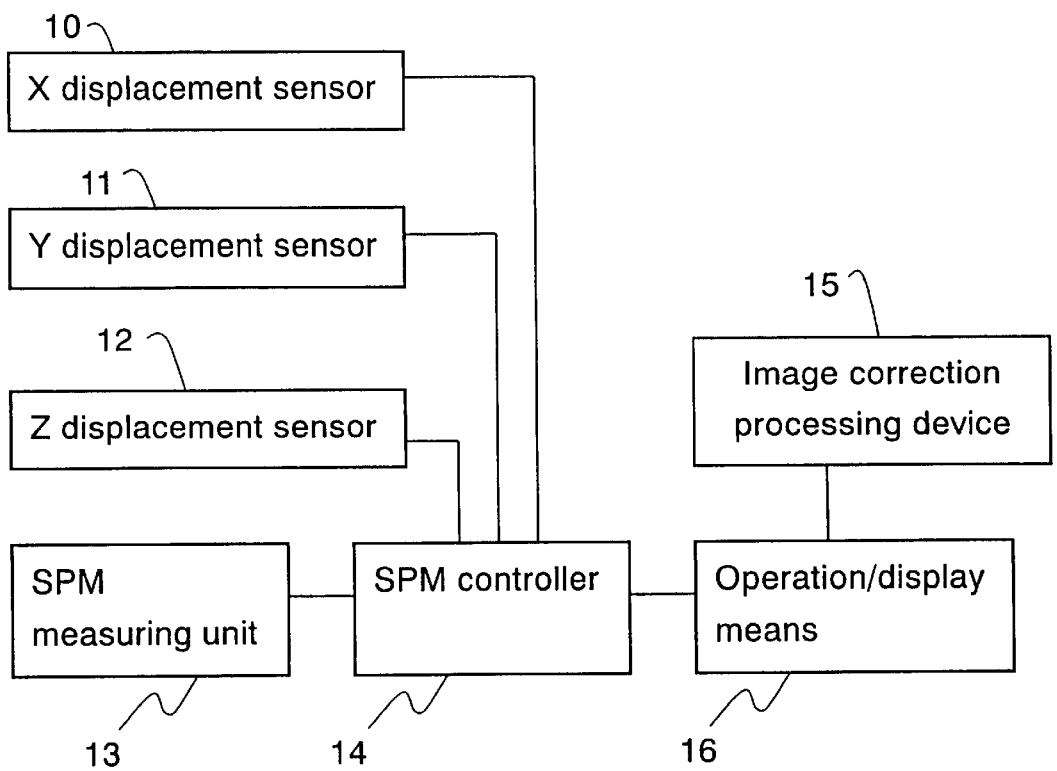
FIG. 2 is a block view showing an overall configuration for a SPM of the present invention.

FIG. 2 is a block view showing an overall configuration for a SPM of this embodiment. A SPM controller 14 controls a SPM measuring unit 13. Further, output values for each displacement sensor are sent to operation/display means 16 fitted to the SPM controller 14. This means that it is necessary to synchronize driving of the scanner 1 and reading out the sensor output during scanning, so that signals can therefore be processed in an effective manner by processing using the SPM controller 14. The operation/display means 16 controls the whole of the SPM and is a computer and program for displaying data. In this embodiment, the output data of the X, Y and Z sensors is sent to image correction processor 15 from the operation/display means 16 and processed.

Figure 3:
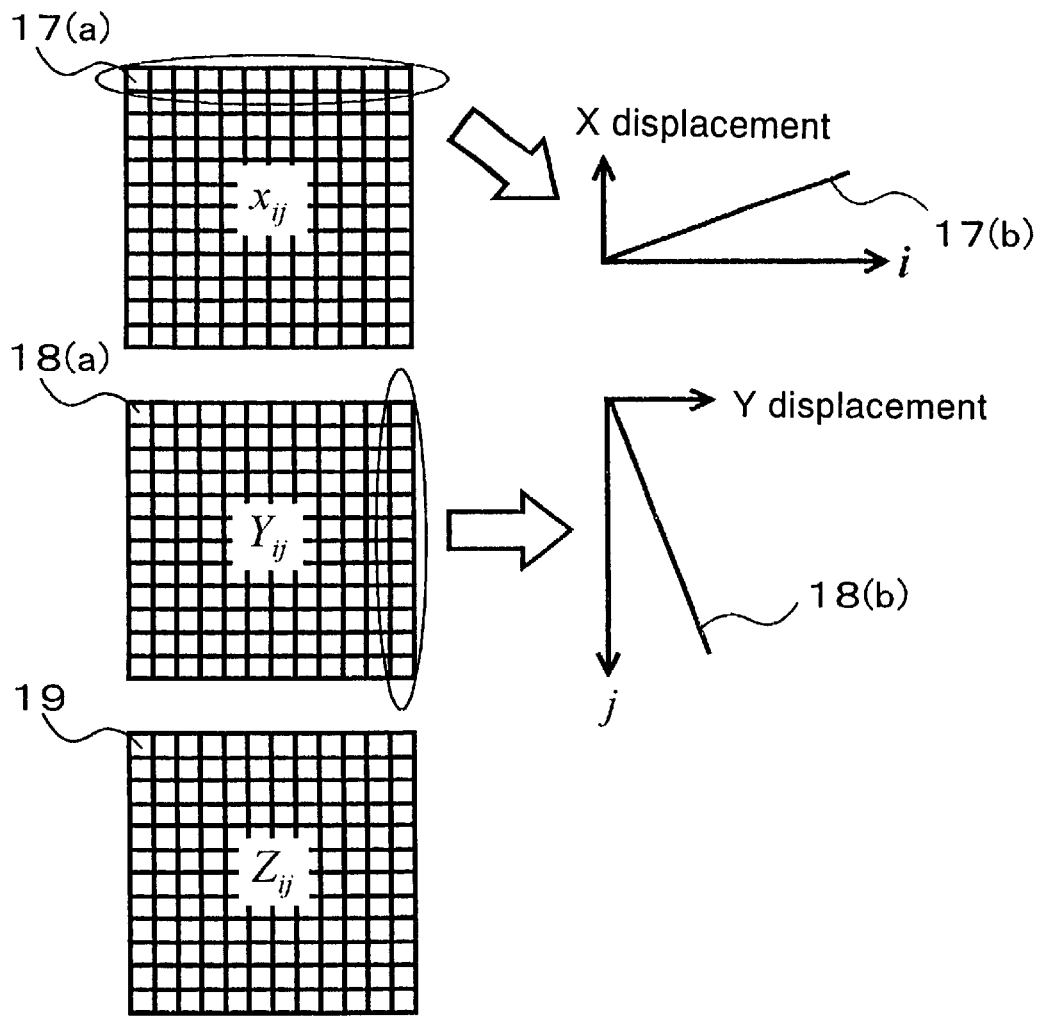
FIG. 3 is an outline view expressing XYZ displacement sensor values.

The aforementioned SPM obtains data arrayed in such a manner that there is the same number of elements for each of the X, Y and Z sensor output values. The output values 17($a$) for X displacement sensor 3, Y-displacement output values 18($a$) and Z-displacement output values 19 are shown schematically as respective data arrays in FIG. 3. In the case of scanning a certain region by repeating an action of moving a distance corresponding to one pixel in the Y direction after scanning one line in the X direction, values for each row for X are displayed as lines increasing incrementally in single units as shown approximately in the X displacement sensor output value line profile 17($b$), and each column for Y is shown increasing in single units as shown by the Y displacement sensor output value line profile 18($b$). FIG. 3 shows ideal scanning results, and in reality the results will include various errors due to scanner hysteresis etc. The Z displacement sensor output values 19 have displacement sensor values showing a height corresponding to the surface shape of the scanned sample stored for each element of the array.

Figure 4:
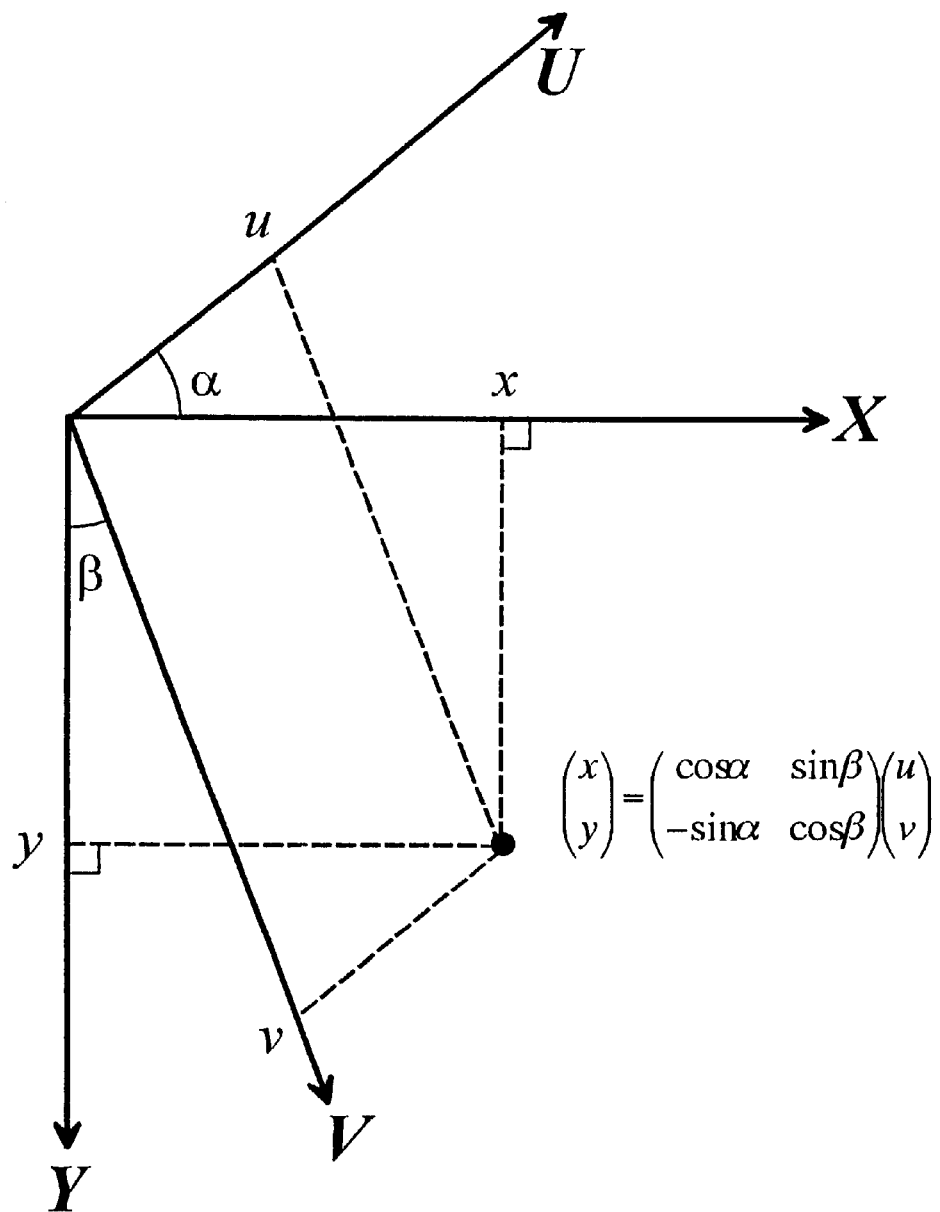
FIG. 4 is an outline view of angle compensation means of the present invention.

There is therefore a problem as to whether or not the output values of the X, Y and Z sensors correctly express scanner displacement. For example, as shown in FIG. 1, if the angle of fitting the X, Y and Z displacement sensors deviates from an ideal angle assumed beforehand, errors will occur. In this case, it is therefore necessary to carry out some kind of compensation to ensure that the displacements shown by the sensor values are correct. FIG. 4 shows example compensation. Consider the case where, as shown in FIG. 4, the X and Y displacement sensor axes are taken as U and V, so that the respective angles deviate from the XY axes constituting ideal axes by just angles a and B. The X and Y axes are set taking into consideration the X Y deviation sensor data shown in FIG. 3. In this case, it is necessary to correct (U, V) on the displacement sensor axes to the ideal XY axes, and it is possible to express these equations as follows.

$$x = u \cdot \cos \alpha + v \cdot \sin \beta$$

$$y = -u \cdot \sin \alpha + v \cdot \cos \beta$$

A correct sensor value can then be obtained by calculating the values for each point for the X Y displacement sensor value based on these equations. This processing is carried out on a computer after obtaining the array of displacement sensor values and this can of course be added to the correction function as electrical signal processing following the displacement sensor output. Correction can also be carried out in the same way when the fitting angle of the Z displacement sensor becomes displaced.

Next, a case is considered where sensor values drift in response to changes in temperature, etc. This drift can be easily corrected if the drift is expressed as a function corresponding to elapsed time. For example, consider the case where displacement sensor output increases linearly in a unitary manner in response to time. In this case, if the amount of drift is taken to be D, the elapsed time is taken to be T, the gradient is taken to be a, and a section is taken to be b, then a function expressing the amount of drift can be represented by:

$$D(T)=a \cdot T+b$$

When intervals, constituted by units of time, at which data is sampled are taken to be $\Delta T$, and an amount of drift per unit time is taken to be $\Delta D$, then:

$$\Delta D=a \cdot \Delta T$$

Correction can then be achieved in a straightforward manner by simply subtracting the amount of drift from increases in the sensor value per unit time. Correction can also be easily achieved in a similar manner if drift in the displacement sensor values is obtained as a function D (T) of time.

Figure 5:
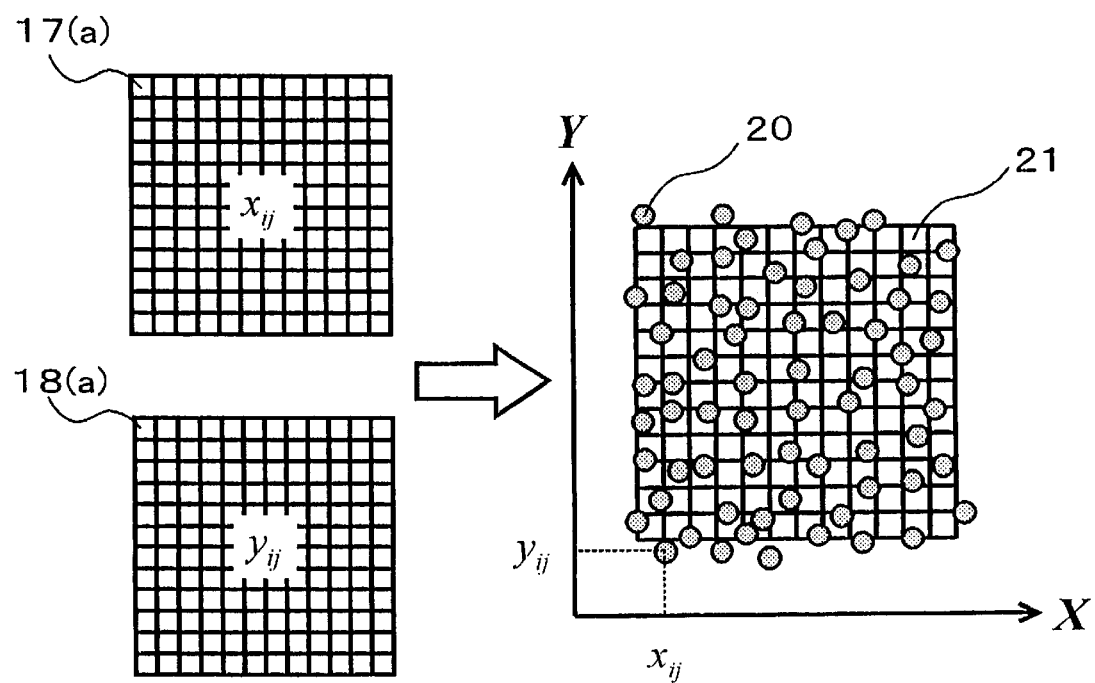
FIG. 5 is a view showing plotting for XY displacement sensor values.

An image that can be said to be true in shape can then be obtained by plotting points in XYZ space taking the respective displacement sensor output values obtained in the above manner as coordinates. However, this makes the amount of data substantial and also means that the load placed on the computer carrying out the processing and on the electrical circuit for signal processing is substantial. Further, as image data such as bit maps handled by computers etc., it is most convenient if the XY coordinates of individual points of an image express scanner displacement as is or that the intensity of these points expresses displacement in the Z-direction. The means for obtaining this kind of image are the aforementioned image correction processor 15. FIG. 5 shows an outline view for the case where points are plotted in an XY plane based on the XY displacement sensor output values. If it is taken that slight variations exist with respect to X and Y, then this gives the kind of sensor value XY plot shown in FIG. 5. An operation where values for Z corresponding to coordinates of data 21 arrayed lined up in equal intervals depicted in the background of the points are interpolated based on this data is the image correction processing of this invention. Data based on three arrays for X, Y and Z can be handled as a single item of data by obtaining this arrayed data in advance. This means that data can be used in an efficient manner and that transfer to image formats such as bit maps generally employed by computers can be achieved in a straightforward manner.

Figure 6:
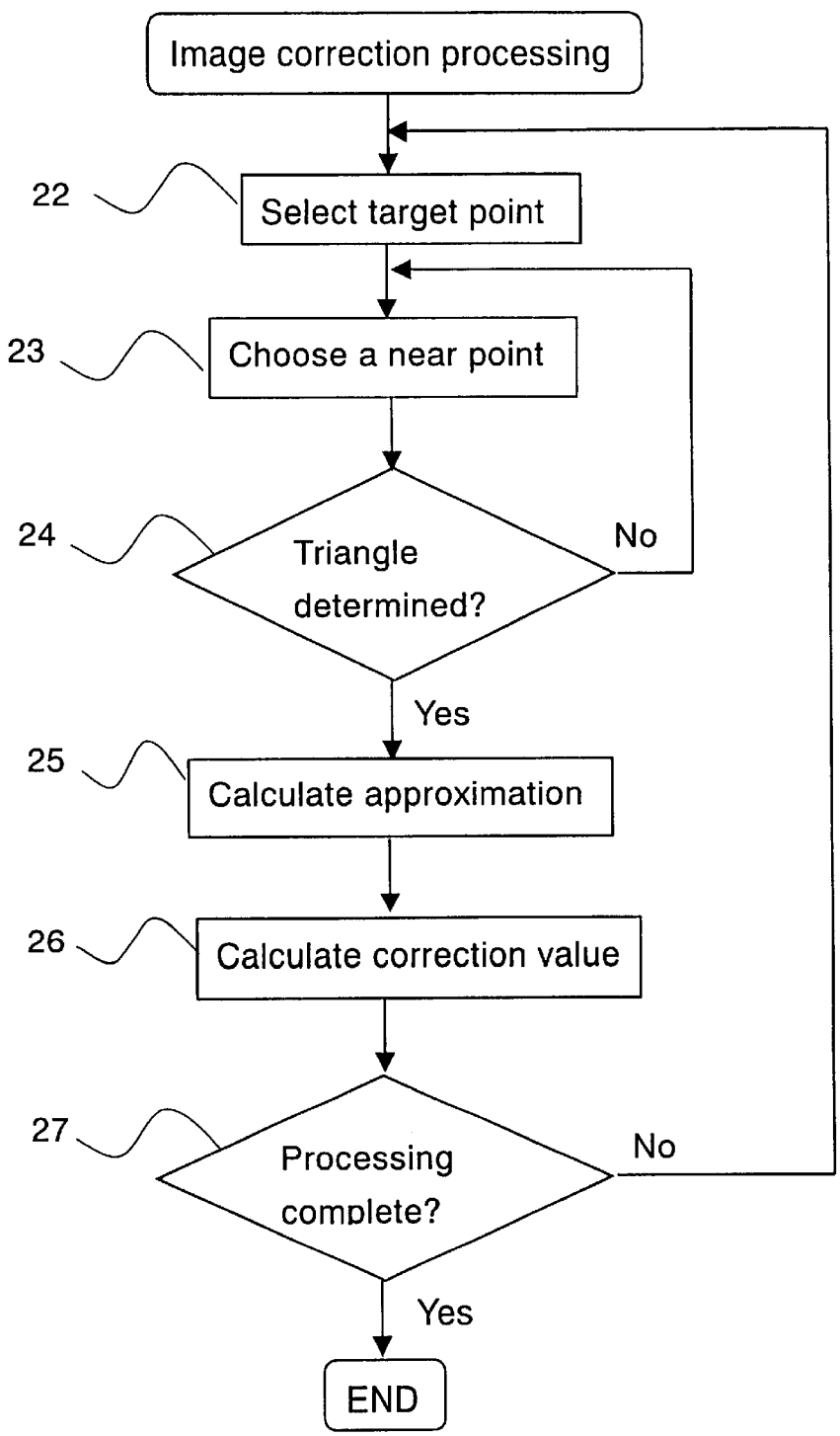
FIG. 6 is a flowchart of image compensation means of the present invention.
Figure 7:
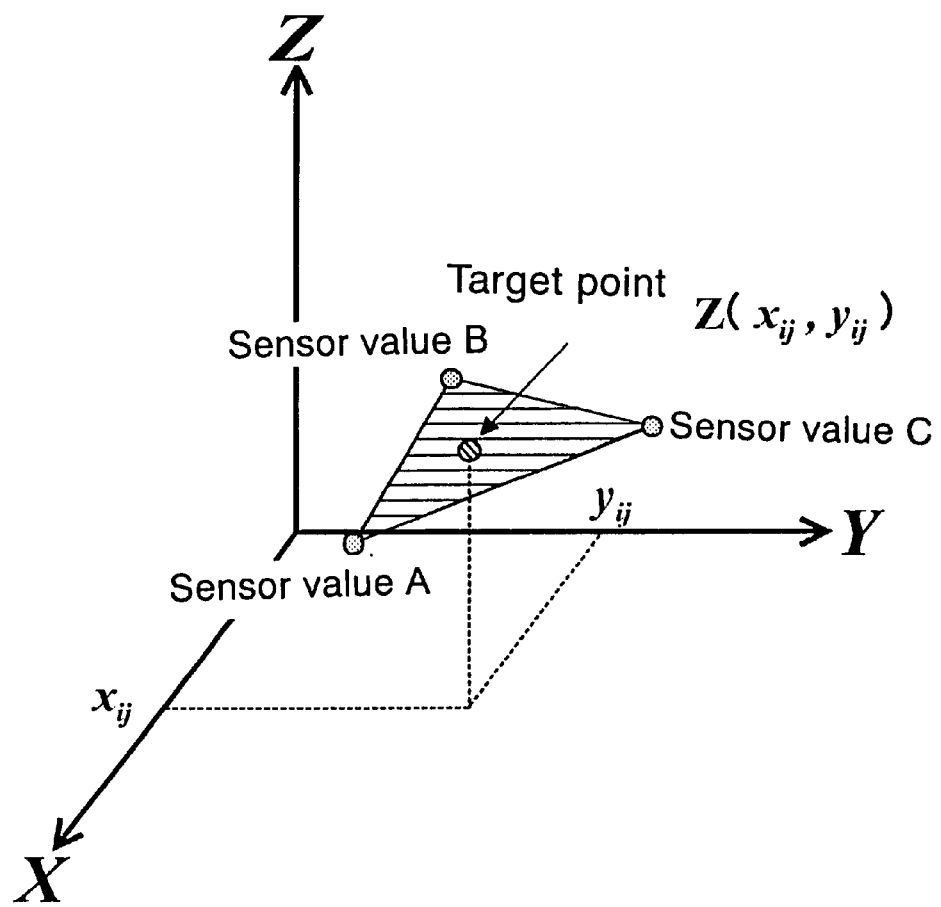
FIG. 7 is an outline view of an example of image compensation means of the present invention.

A rough description of the flow is now given based on the flowchart shown in FIG. 6. An outline view of a correction method is shown in FIG. 7. First, at a target point selection process 22, the XY coordinates of a point of an array of equally spaced data intended to be obtained is obtained. These XY coordinates are the target point shown in FIG. 7. A group of the three closest points to these coordinates as shown by the sensor value A, sensor value B and sensor value C of FIG. 7 are then selectively extracted from the group of sensor values. This process is carried out at a near point choosing process 23 of FIG. 6. Next, at a triangle determining process 24, this group of three close points is made to form a triangle in the XY plane and a determination is made as to whether or not the target point is present within this triangle. An equation expressing a plane in three dimensional space constituted by this group of three points is then obtained (approximation calculation process 25) and a Z value for the target point can then be obtained (correction value calculation process 26) by inputting the XY coordinates of the target point into this equation. This process is repeated until completion is determined by a processing end determination process 27, i.e. repeated by just the number of elements of arrayed data constituting the correction results, so that a corrected image is obtained.

Figure 8:
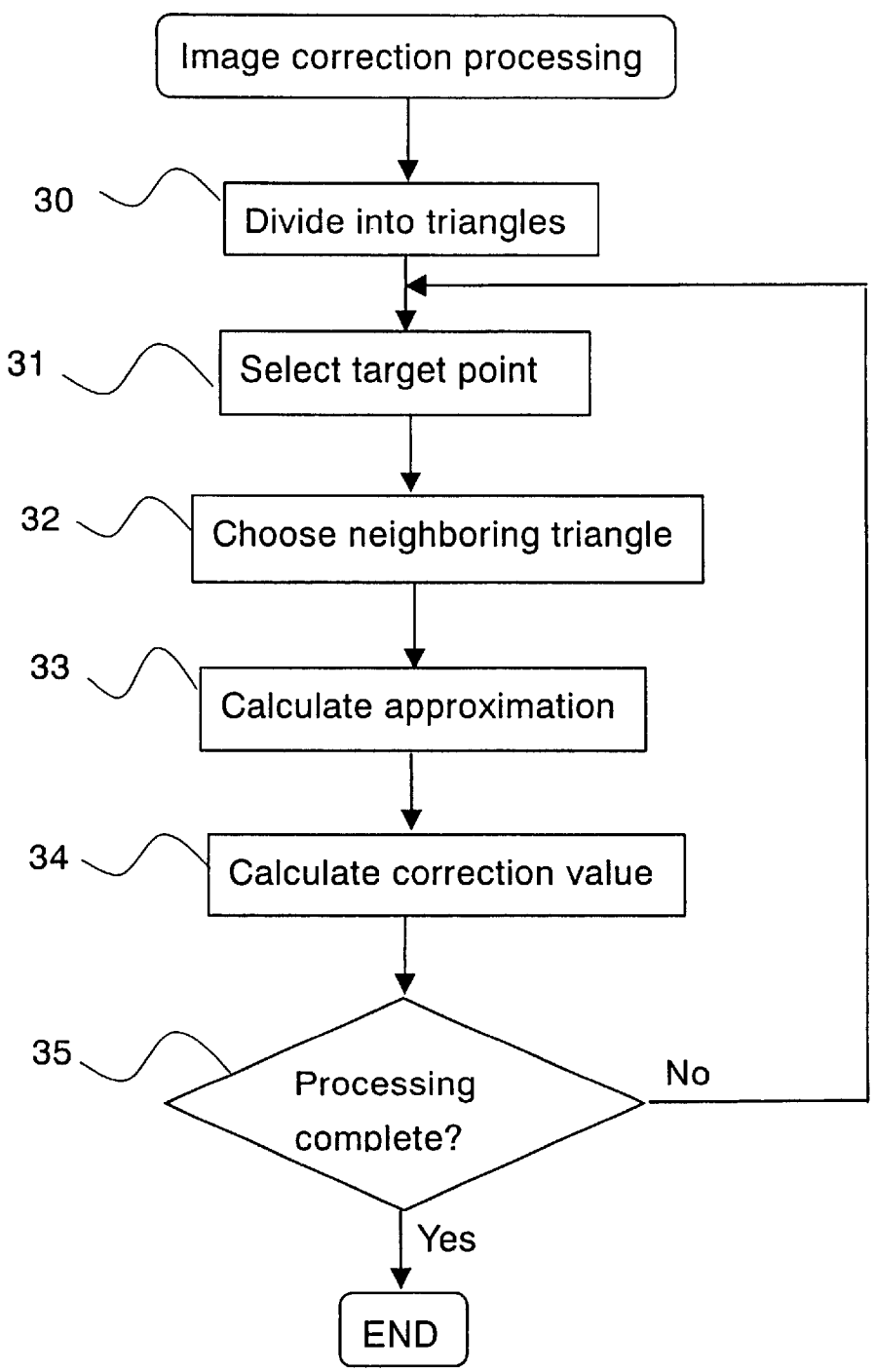
FIG. 8 is a flowchart of image compensation means employing a method of dividing a shape into triangles of the present invention.
Figure 9:
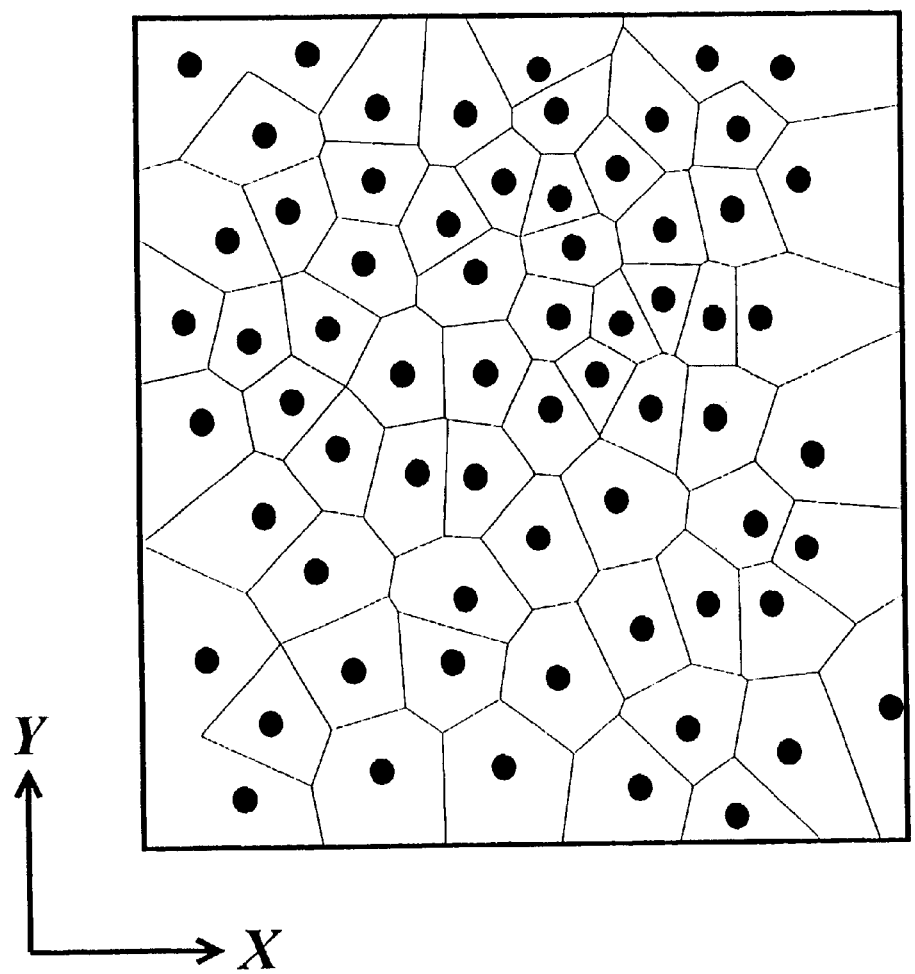
FIG. 9 is an example of a Voronoi view.
Figure 10:
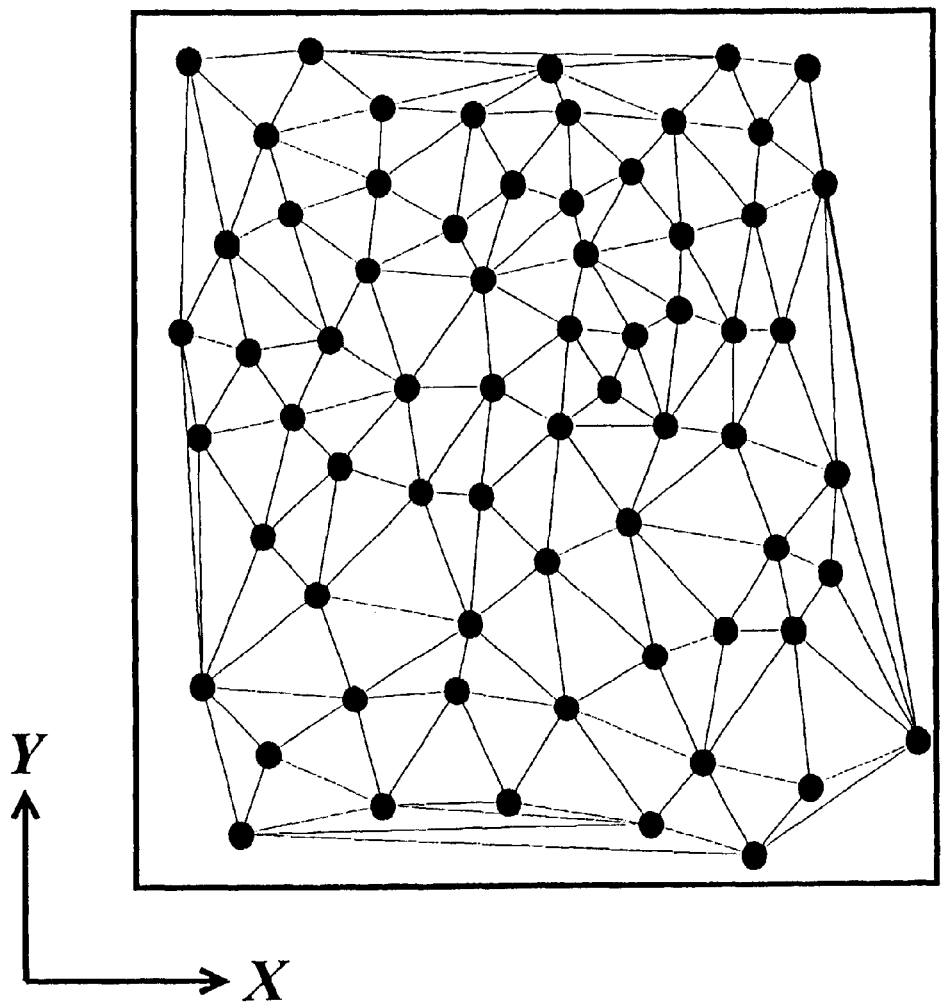
FIG. 10 is an example of a Delaunay view.

In FIG. 6, after choosing each print of the corrected image as a target point, three points close to this point are detected, and a determination is made as to whether or not these three points form a triangle. However, there is also a method whereby whether or not the target point is present within a triangle is detected after dividing the group of XY sensor values into a triangle by linking each point. This method is shown in the flowchart of FIG. 8. In this case, dividing up into triangles is carried out at a triangle dividing process 30 and the widely used Delaunay triangular dividing method is given as an example of this method. In his case, it is first necessary to make a Voronoi diagram, as sown in FIG. 9. It is taken that each of the points (hereinafter referred to as generatrix points) in FIG. 9 are located on a plane based on the XY sensor values. Polygons encompassing each point are referred to as Voronoi polygons and the boundary of each polygon consists of two equal vertical lines of line segments linking each generatrix. An apex of a Voronoi polygon, referred to as a Voronoi point, is always the interaction of three sides. This means that there are always three generatrix points located about the periphery of a Voronoi point. A triangle connecting the three points is referred to as a Delaunay triangle. It is therefore possible to effectively divide a plane up into triangles if points for all of the Delaunay triangles are shown collectively in FIG. 10 and this is referred to as a Delaunay diagram. The above method is the Delaunay triangular dividing method but this method is also advantageous with respect to the precision of the approximation calculations carried out thereafter because Delaunay triangles give shapes relatively close to equilateral triangles. This method can also be generally utilized in a wide variety of fields including structural analysis and image processing etc. and is advantageous from the point of view of performance. However, with this method it is necessary to store and process Voronoi points and Delaunay triangles in advance, which increases the load placed on the storage capacity etc. of the computer used due to the processing in FIG. 6. As a result of this, there is a possibility that the process of FIG. 6 will not be selected and acquired depending upon the performance of the computer used.

After the aforementioned triangular dividing, as shown in FIG. 8, a corrected image is obtained by repeating a continuous flow of calculating XY coordinates for a target point (target point selection process 31), choosing a Delaunay triangle including the target point (near triangle selection process 32), calculating an approximation from the three points constituting the Delaunay triangle (approximation calculation process 33), and calculating correction values form the approximation (correction value calculation process 34) until completion is determined at the processing completion determination process 35.

In the processes in FIG. 6 and FIG. 8, highly accurate correction is possible by carrying out the respective planar approximations but it is necessary to obtain equations expressing planes for all of the points and there are therefore cases where this may take time. The processing speed can therefore be increased by adopting a method where a Z displacement sensor value for the nearest point is substituted for the Z value for the target point or where Z displacement sensor values for a number of groups in the vicinity of the target point is averaged and then substituted for the Z value for the target point, but precision will be sacrificed.

Figure 11:
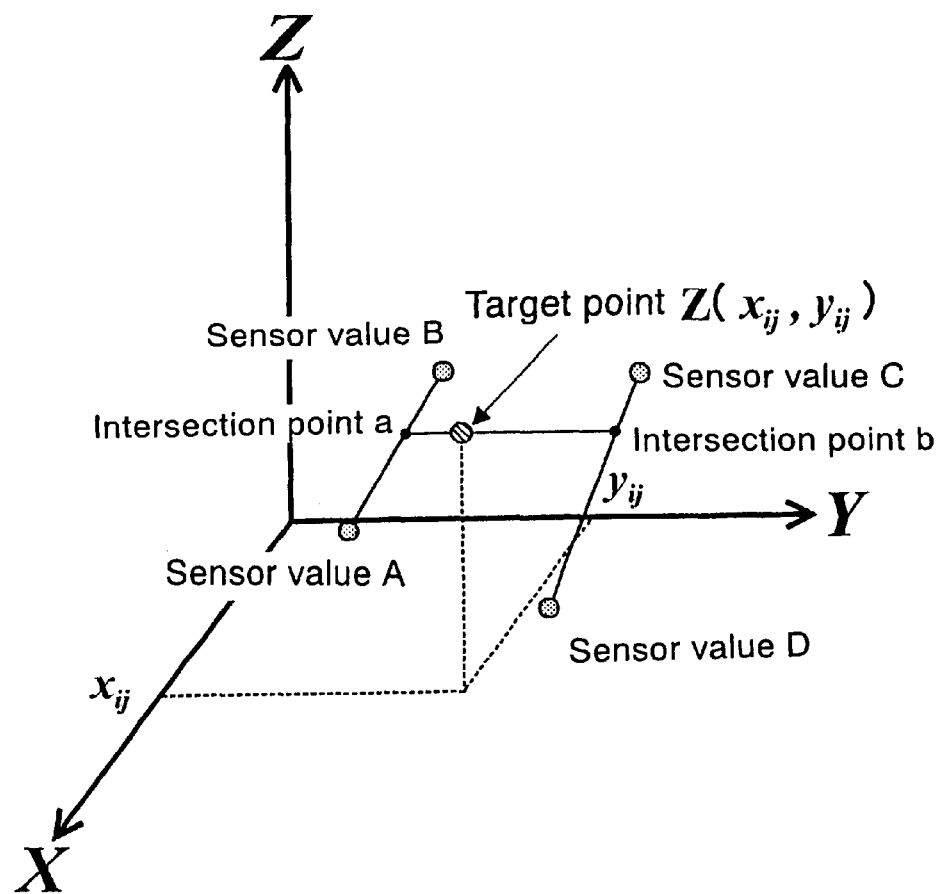
FIG. 11 is an outline view of an example of image compensation means of the present invention.

A method shown in the outline view in FIG. 11 can also be considered for the image correction processing. A group of four sensor values surrounding a target point and comprising a quadrangle are chosen as shown in FIG. 11 by the near point choosing process 23 of FIG. 6. Next, a straight line passing through the target point parallel to the Y axis is drawn by the approximation calculation process 25 with respect to a straight line connecting sensor value A and sensor value B, and a straight line connecting sensor value C and sensor value D, with X and Z coordinates being obtained for points of intersection a and b where the line passing through the target point intersects the other two straight lines. It is then possible to obtain a Z value for the target point from an approximation for a straight line linking the points of intersection a and b.

Figure 12:
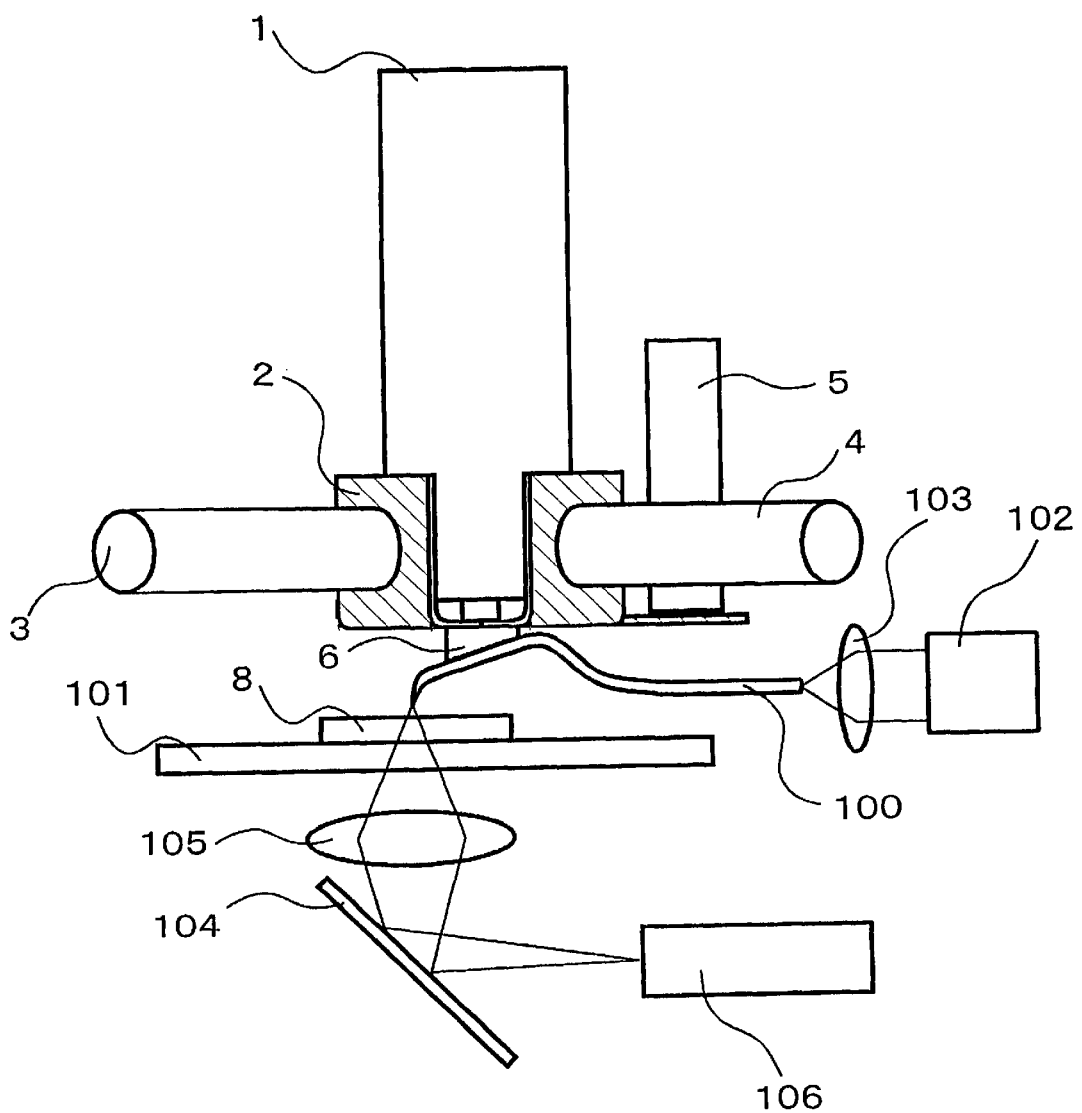
FIG. 12 is a schematic view of a configuration of a scanning near-field microscope of the present invention.
Figure 13:
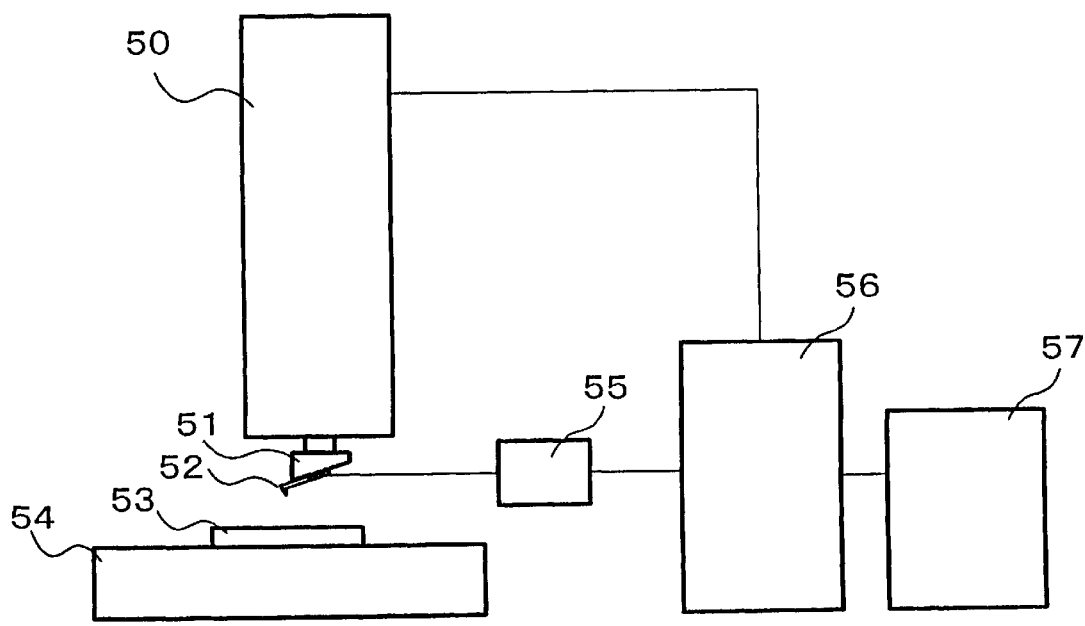
FIG. 13 is a schematic view of a configuration for a related SPM.
Figures 14A, 14B:
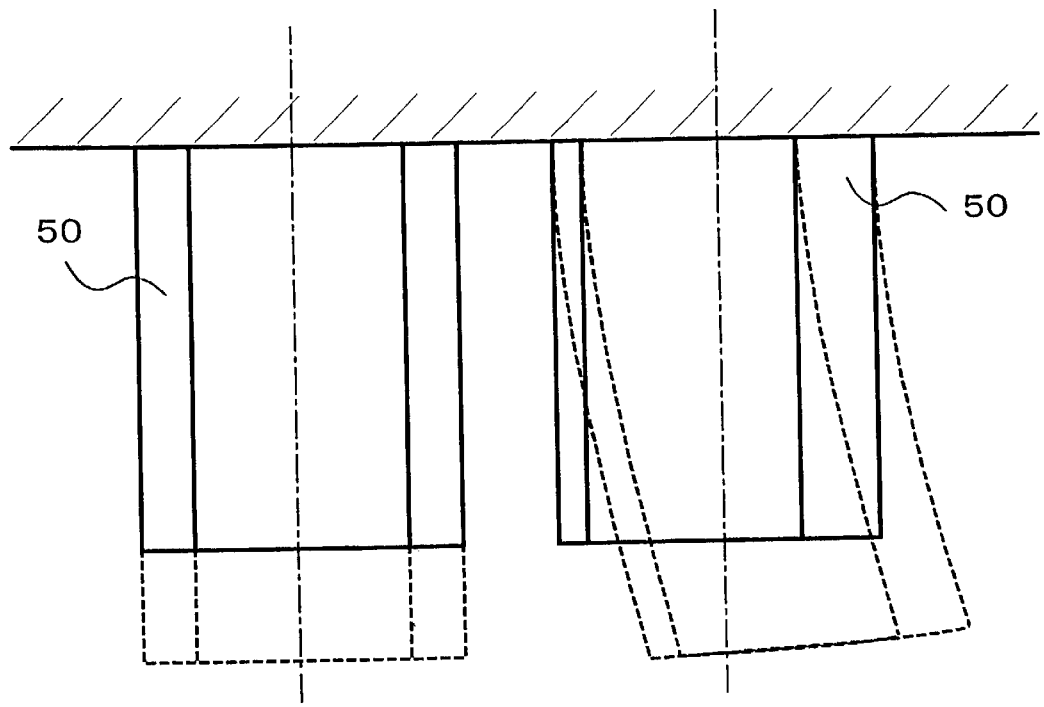
FIG. 14A is a cross-sectional view of a cylindrical piezo-electric element of uniform thickness.
FIG. 14B is a cross-sectional view of a cylindrical piezo-electric element of non-uniform thickness.

In the embodiment described above, a description is given of a method of obtaining an image of a highly accurate shape based on all of the sensor values but it is also possible to measure various characteristics other than height with a SPM such as light, frictional force, and surface potential, etc. In this case it is also possible to simultaneously record this characteristic information in advance together with the X and Y sensor values for use in place of the arrayed data for the Z sensor values so that characteristic images that are highly accurate in the XY direction can be obtained. As an example of this, a schematic view of a configuration for the case where the SPM measuring unit shown in FIG. 1 is utilized as a scanning near field microscope is shown in FIG. 12. In FIG. 12, a point of distinction with FIG. 1 is that an optical probe 100 made from a light propagating body such as an optical fiber is used in order to illuminate the sample 8 with light, and a condensing lens 103 and light source 102 are added in order to ensure that light is incident at the probe 100. Light passing through the sample 8 is guided towards a light detector 106 by a mirror 104 and a condenser lens 105 so that the optical characteristics of the sample 8 can be measured. It is therefore necessary for a sample table 101 used here to be of a shape and material that does not block light that passes through the sample 8. Optical characteristic information obtained by a light detector 106 is saved as arrayed data as with the aforementioned Z sensor values so that an optical characteristic image that is highly accurate with respect to positioning in the X and Y directions can be obtained.

If displacement in the Z direction is microscopic so that sufficient precision can be obtained without employing a sensor, then it is possible to obtain a shape image by performing correction taking a drive signal in a Z direction inputted to a scanner as data expressing the height direction, as with the related probe microscope.

As described above, a scanning probe microscope of the present invention comprises microscopic driving means for driving a sample or probe microscopically in X, Y and Z directions, displacement detection means capable of measuring displacement of the microscopic driving means in the X, Y and z directions, and image correction means for recording values outputted by each displacement detection means as arrayed data during scanning of a sample with a probe, and making an output image from the recorded arrayed data with the relative positions with respect to the X, Y and Z directions corrected. With this construction, the actual shape of the sample etc. can be repeatedly reproduced with a high degree of accuracy without being influenced by hysteresis or non-uniform operation of a piezoelectric element or being influenced by environmental conditions. As a result, a SPM can be utilized in a measuring apparatus for measuring the surface conditions of a semiconductor or recording medium to a high degree of accuracy.

What is claimed is:

1. A scanning probe microscope comprising:
    a driving unit for driving one of a sample and a probe microscopically in X, Y and Z directions to cause scanning movement of the one relative to the other;
    a displacement detector for measuring displacement of the driving unit in the X, Y and Z directions to obtain a plurality of measurement data values in each of the three directions during the scanning movement; and
    an image correction device for storing the measurement data values output by the displacement detector in the form of a data array for each of the X, Y and Z directions, performing a correction process for correcting the data arrays in the X, Y and Z directions without using calibration data obtained by scanning a specimen having a known shape, and producing an output image based on the corrected data arrays.

2. A scanning probe microscope according to claim 1; wherein the correction process comprises correction of an angle of deviation of the displacement detector from an ideal angular position in at least one of the X, Y and Z directions.

3. A scanning probe microscope according to claim 1; wherein the correction process comprises correcting for a drift in measurement data values output by the displacement detector with respect to time.

4. A scanning probe microscope according to claim 1; further comprising a characteristic information measuring unit for measuring representing one or more characteristics of a surface of the sample simultaneously with measurement of data values output by the displacement detector in each of the X and Y directions; wherein the image correction device stores the measurement data values output by the displacement detector and output values of the characteristic information measuring unit as data arrays during the scanning and produces an output image based on the stored data arrays and the characteristic information while performing the correction process in the three directions.

5. A scanning probe microscope according to claim 1; wherein the image correction device comprises a near point choosing unit for choosing one or more measurement data values having X and Y coordinates in the vicinity of those of individual points of an output image produced based on the data arrays, and a correction value calculator for performing the correction process by calculating corrected values for the data arrays constituting intensity values of the individual points of the image output from chosen near points; wherein the X and Y coordinates of the individual points of the output image correspond to displacement of the driving unit in the X and Y directions in an equally spaced manner and the intensity of the individual points corresponds to one of displacement in the Z direction of the driving unit or surface characteristic information of the sample.

6. A scanning probe microscope according to claim 5; wherein the near point choosing unit chooses two or more measurement data values having X and Y coordinates closest to those of a plurality of target points in the output image.

7. A scanning probe microscope according to claim 6; wherein the correction value calculator uses a Z-direction output value of the displacement detector corresponding to the measurement data values chosen by the near point choosing unit as a correction value.

8. A scanning probe microscope according to claim 6; wherein the correction value calculator calculates an average value for Z displacement detector output values included in two or more groups of data chosen by the near point choosing unit as a correction value.

9. A scanning probe microscope according to claim 5; wherein the near point choosing unit chooses three measurement data values in the vicinity of each of a plurality of target points in the output image from the data arrays in the X, Y and Z directions, forms the three chosen measurement data values into a triangle in an XY plane, and determines whether or not a corresponding target point is within the triangle.

10. A scanning probe microscope according to claim 5; wherein the near point choosing unit divides an XY plane containing the data arrays of the displacement detector output values into groups each having three points and forming a triangle, each group including a target point of the output image on which the correction process is performed.

11. A scanning probe microscope according to claim 10; wherein the correction value calculator obtains a correction value using an approximation plane formed within XYZ space from the three groups of data chosen by the near point choosing unit.

12. A scanning probe microscope according to claim 10; wherein the correction calculator obtains an approximation line both passing through and linking individual points of a side and a facing side of a quadrilateral formed in XYZ space, from a group of four items of data chosen by the near point choosing unit.

13. A scanning probe microscope according to claim 5; wherein the near point choosing unit chooses four measurement data values in the vicinity of each of plural target points in the output image from the data arrays of the displacement detector output values in the X, Y and Z directions, forms a quadrilateral in an XY plane using the four chosen measurement data values, and determines whether or not a respective target point is within the quadrilateral.

14. A scanning probe microscope comprising:
  driving means for driving one of a sample and a probe microscopically in X, Y and Z directions to cause scanning movement of the one relative to the other;
  displacement detection means for measuring displacement of the driving means in the X, Y and Z directions to obtain measurement data values in each of the three directions during the scanning; and
  image correction means for storing the measurement data values output by the displacement detection means in the form of a data array for each of the X, Y and Z directions, performing a correction process for correcting the data arrays in each of the X, Y and Z directions without using calibration data obtained by scanning a specimen having a known shape, and obtaining an output image based on the corrected data arrays.

15. A scanning probe microscope according to claim 14; wherein the correction process comprises correction of an angle of deviation of the displacement detection means from an ideal angular position in at least one of the X, Y and Z directions.

16. A scanning probe microscope according to claim 14; wherein the correction process comprises correcting for a drift in measurement data values output by the displacement detection means with respect to time.

17. A scanning probe microscope according to claim 14; further comprising characteristic information measuring means for measuring information representing one or more characteristics of a surface of the sample simultaneously with measurement of data values of the displacement detection means for each of the X and Y directions; wherein the image correction means stores the measurement data values output by the displacement detection means and output values of the characteristic information measuring means as data arrays during the scanning and produces an output image based on the stored data arrays and the characteristic information while performing the correction process in the three directions.

18. A scanning probe microscope according to claim 14; wherein the image correction means comprises near point choosing means for choosing one or more measurement data values having X and Y coordinates in the vicinity of those of individual points of an output image produced based on the data arrays, and correction value calculating means for performing the correction process by calculating corrected values for the data arrays constituting intensity values of the individual points of the image output from chosen near points; wherein the X and Y coordinates of the individual points of the output image correspond to displacement values of the driving means in the X and Y directions in an equally spaced manner and the intensity of the individual points corresponds to one of displacement in the Z direction of the driving means or surface characteristic information of the sample.

* * * * *